(12) United States Patent
Kim

(10) Patent No.: US 11,320,654 B2
(45) Date of Patent: May 3, 2022

(54) HEADUP DISPLAY DEVICE

(71) Applicant: Hyundai Mobis Co., Ltd., Seoul (KR)

(72) Inventor: Byung Ki Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 70 days.

(21) Appl. No.: 16/851,721

(22) Filed: Apr. 17, 2020

(65) Prior Publication Data

US 2020/0333600 A1 Oct. 22, 2020

(30) Foreign Application Priority Data

Apr. 18, 2019 (KR) .................. 10-2019-0045331
May 8, 2019 (KR) .................. 10-2019-0053941

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *G02B 27/0179* (2013.01); *B60K 2370/1529* (2019.05); *B60K 2370/23* (2019.05); *G02B 2027/0161* (2013.01); *G02B 2027/0183* (2013.01)

(58) Field of Classification Search
None
See application file for complete search history.

(56) References Cited

U.S. PATENT DOCUMENTS

| 6,837,581 B1 * | 1/2005 | Raines | G02B 27/0149 |
| | | | 353/13 |
| 2014/0176425 A1 * | 6/2014 | Bae | G02B 27/01 |
| | | | 345/156 |
| 2019/0219823 A1 * | 7/2019 | Henon | B60K 35/00 |
| 2019/0285889 A1 * | 9/2019 | Ogura | G02B 27/0149 |

* cited by examiner

*Primary Examiner* — Roy P Rabindranath
(74) *Attorney, Agent, or Firm* — H.C. Park & Associates, PLC

(57) ABSTRACT

A headup display device may include: a mirror part rotatably supported by a support part; a housing part installed on one side of the mirror part; a driving part installed in the housing part; a spiral gear part rotatably connected to the driving part; and a mirror rotating part connected to the mirror part, and configured to rotate the mirror part as the spiral gear part is rotated.

18 Claims, 17 Drawing Sheets

HEADUP DISPLAY DEVICE

CROSS-REFERENCE TO RELATED APPLICATION

This application claims priority from and the benefit of Korean Patent Application No. 10-2019-0045331, filed on Apr. 18, 2019 and Korean Patent Application No. 10-2019-0053941, filed on May 8, 2019, which are hereby incorporated by reference for all purposes as if set forth herein.

BACKGROUND

Field

Exemplary embodiments of the present disclosure relate to a headup display device, and more particularly, to a headup display device capable of minutely adjusting the tilting angle of a mirror part.

Discussion of the Background

In general, a headup display device is installed in an instrument panel of a vehicle. The headup display device projects a virtual image onto a visible area (front window) of a driver. The driver can directly check driving information while keeping eyes forward.

The headup display device includes a display unit and a mirror part. The mirror part includes a driving part installed to adjust the angle of the mirror part. The mirror part is connected to a power transfer part by a link part.

In the conventional headup display device, however, the link part is installed in point contact with the power transfer part. Thus, a load is concentrated on the point contact portion by vibration, acceleration and friction of the vehicle. Therefore, when driving precision is reduced as the abrasion and deformation in the point contact portion of the link part are relatively increased, optical performance may be degraded.

Since the driving part rotates the mirror part using a lead screw and a step motor, there is a limitation in increasing resolving power due to the pitch of the lead screw and the rotation angle precision of the step motor. Therefore, there is a need for a device capable of solving the problem.

The related art of the present disclosure is disclosed in Korean Patent Application Laid-Open No. 2011-0010730 published on Feb. 7, 2011 and entitled "Power Transmission Device".

The above information disclosed in this Background section is only for enhancement of understanding of the background of the invention and, therefore, it may contain information that does not constitute prior art.

SUMMARY

Various embodiments are directed to a headup display device capable of finely adjusting a tilting angle of a mirror part.

In an embodiment, a headup display device may include: a mirror part rotatably supported by a support part; a housing part installed on one side of the mirror part; a driving part installed in the housing part; a spiral gear part rotatably connected to the driving part; and a mirror rotating part connected to the mirror part, and configured to rotate the mirror part as the spiral gear part is rotated.

The driving part may include: a driving motor mounted in the housing part; and a driving shaft formed in the driving motor through the housing part, connected to the spiral gear part, and rotated as power is applied to the driving motor.

The spiral gear part may include: a spiral plate connected to the driving part; and a spiral protrusion formed on the spiral plate, and protruding in a spiral shape to rotate the mirror rotating part.

The mirror rotating part may include: a rotation coupler connected to the mirror part; and a rotation gear formed on the outer circumferential surface of the rotation coupler, and engaged with the spiral protrusion.

The rotation of the spiral gear part may be restricted by the rotation of the mirror rotating part.

The headup display device may further include an elastic part connected to the mirror part, and configured to apply an elastic force to the mirror part such that the mirror rotating part is pressed against the spiral gear part.

The headup display device may further include a switch part configured to sense an angular position of the mirror part.

The switch part may include: a mirror switch mounted on the mirror part; and a switch sensor mounted on the housing part and configured to sense the mirror switch.

The switch part may include a current sensor configured to sense a stall electric current of the driving part. When the rotation of the mirror part is restricted, the current sensor may sense the stall electric current of the driving part, and consider that the mirror part has reached a home position.

The switch part may include a displacement sensor configured to sense an angular displacement of the driving part. When an angular displacement of the driving part is equal to an angular displacement for making the mirror part reach the home position, the switch part may consider that the mirror part has reached the home position.

In another embodiment, a headup display device may include: a mirror part configured to reflect an image emitted from a display unit; a support part installed on one side of the mirror part; a driving motor installed on the support part; a driving wheel connected to the driving motor so as to be rotated by the driving motor; and a mirror link part having one end connected to the mirror part and the other end connected to the driving wheel, and configured to rotate the mirror part according to the rotation of the driving wheel.

The mirror part may include: a pair of hinges protruding outward from both side surfaces of the mirror part on a rotating shaft; and a mirror support rotatably coupled to each of the hinges, and configured to rotatably support the mirror part.

The driving wheel may include: a wheel body formed in a disk shape, and coupled to the driving motor so as to be rotated by rotation of the driving motor; a guide extended outward from the outer circumferential surface of the wheel body; and a sliding protrusion extended from an end of the guide toward the mirror part, and slidably coupled to the mirror link part.

The sliding protrusion may have a groove cut in a longitudinal direction.

The mirror link part may include: a link body coupled to the mirror part; a link lever protruding from one side of the mirror part; and a link slot formed in the link lever such that the sliding protrusion is disposed through the link slot.

The link slot may have an inner diameter smaller than the outer diameter of the sliding protrusion.

The driving wheel may further include a fixing ring coupled to an end of the sliding protrusion disposed through the link slot.

The headup display device may further include an elastic member connected to the mirror part, and configured to apply an elastic force to press the link lever against the link slot.

The headup display device may further include a switch part installed on the support part and configured to sense an angular position of the mirror link part.

The switch part may be installed so as to be brought into contact with the link lever when the mirror link part reaches a home position.

In the headup display device in accordance with the embodiment of the present disclosure, the mirror rotating part is engaged and rotated with the spiral protrusion when the spiral gear part is rotated. Thus, the rotation angle of the mirror rotating part may be finely changed. Therefore, the tilting angle of the mirror part can be precisely adjusted, and the resolving power of the mirror part can be improved. Since the resolving power of the mirror part is improved, the optical performance of the headup display device can be improved.

In the headup display device in accordance with the embodiment of the present disclosure, the elastic part may apply an elastic force to the mirror part so as to press the mirror rotating part against the spiral gear part. Thus, when the spiral gear part is rotated, a backlash between the mirror rotating part and the spiral gear part may be prevented to minimize a position error of the mirror rotating part. Therefore, since the rotation angle of the spiral gear part is accurately controlled, the tilting angle of the mirror part can be accurately adjusted.

In the headup display device in accordance with the another embodiment of the present disclosure, the driving motor may be configured as a step motor. Thus, the resolving power of the mirror part can be improved by the gear reduction ratio within the motor, and the optical performance of the headup display device can be improved. Furthermore, the headup display device can finely adjust the tilting angle of the mirror part according to a passenger's height.

Thus, the driving motor installed on the support part may be coupled to the driving wheel and rotate the driving wheel, which makes it possible to prevent the driving wheel from vibrating when the driving wheel is rotated. As the driving wheel is prevented from vibrating, the rotation angle of the mirror link part can be accurately controlled.

Furthermore, the sliding protrusion has the groove formed at the end thereof and cut in the longitudinal direction thereof. Thus, when the sliding protrusion is inserted into the mirror link part during the process of coupling the mirror link part to the sliding protrusion, the sliding protrusion may be retracted by the groove such that the mirror link part can be easily assembled to the driving wheel 400. After the sliding protrusion and the mirror link part are assembled, the mirror link part may be reliably fixed to the sliding protrusion by an elastic force which is generated while the end of the sliding protrusion is opened by the groove.

Furthermore, the elastic member may apply an elastic force to pressurize the mirror part downward such that the sliding protrusion is pressed against the link slot. Thus, when the driving wheel is rotated, it is possible to suppress a gap from being formed between the sliding protrusion and the link slot, thereby preventing an error in rotation angle of the mirror part. Furthermore, since the rotation angle of the driving wheel is accurately controlled, the rotation angle of the mirror part can be accurately adjusted.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
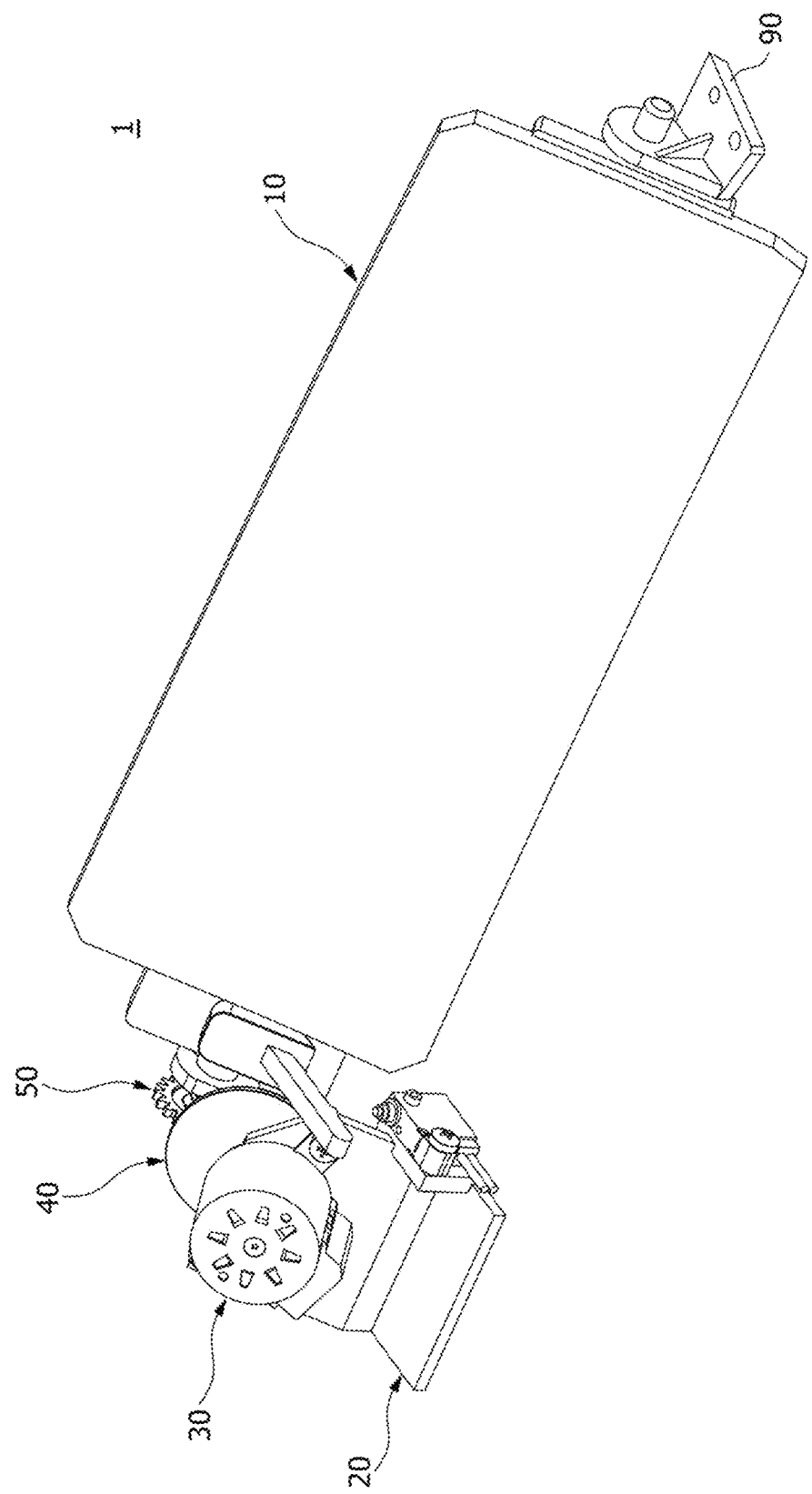
FIG. 1 is a front perspective view schematically illustrating a headup display device in accordance with an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Hereinafter, a headup display device will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
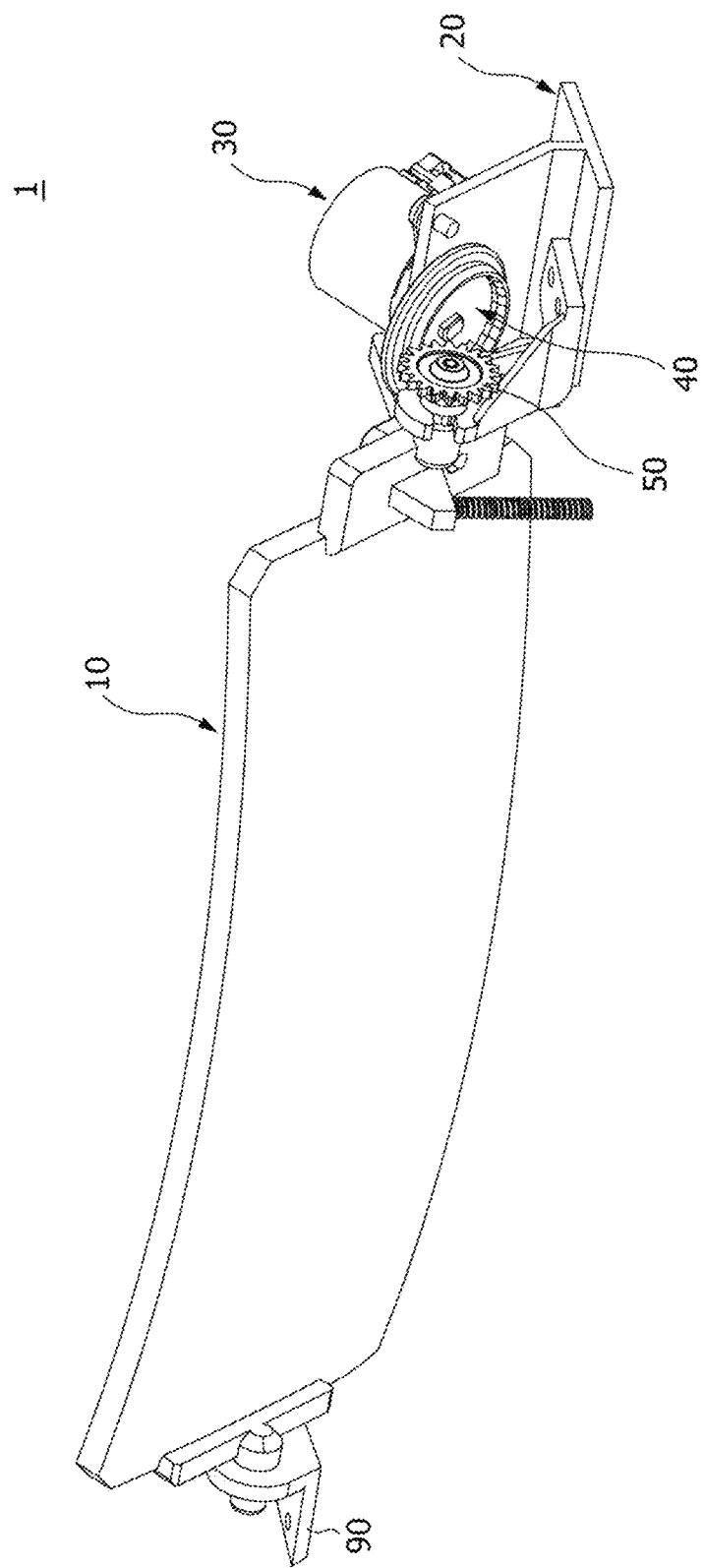
FIG. 2 is a rear perspective view schematically illustrating the headup display device in accordance with the embodiment of the present disclosure.

FIG. 1 is a front perspective view schematically illustrating a headup display device in accordance with an embodiment of the present disclosure, and FIG. 2 is a rear perspective view schematically illustrating the headup display device in accordance with the embodiment of the present disclosure. Referring to FIGS. 1 and 2, the headup display device 1 in accordance with the embodiment of the present disclosure includes a mirror part 10, a housing part 20, a driving part 30, a spiral gear part 40 and a mirror rotating part 50.

The mirror part 10 is rotatably supported by a support part 90. For example, the mirror part 10 is an aspherical mirror, and reflects an image emitted from a display unit (not illustrated).

The housing part 20 is installed on one side of the mirror part 10. For example, the housing part 20 may be formed as one body with the support part 90, or manufactured as a separate part from the support part 90.

The driving part 30 is installed in the housing part 20, and the spiral gear part 40 is connected to the driving part 30 and can be rotated. The mirror rotating part 50 is connected to the mirror part 10, and rotates the mirror part 10 as the spiral gear part 40 is rotated. For example, the spiral gear part 40 and the mirror rotating part 50 may be connected so as to be interlocked to each other, and the mirror rotating part 50 may be disposed on a rotating shaft of the mirror part 10.

Figure 3:
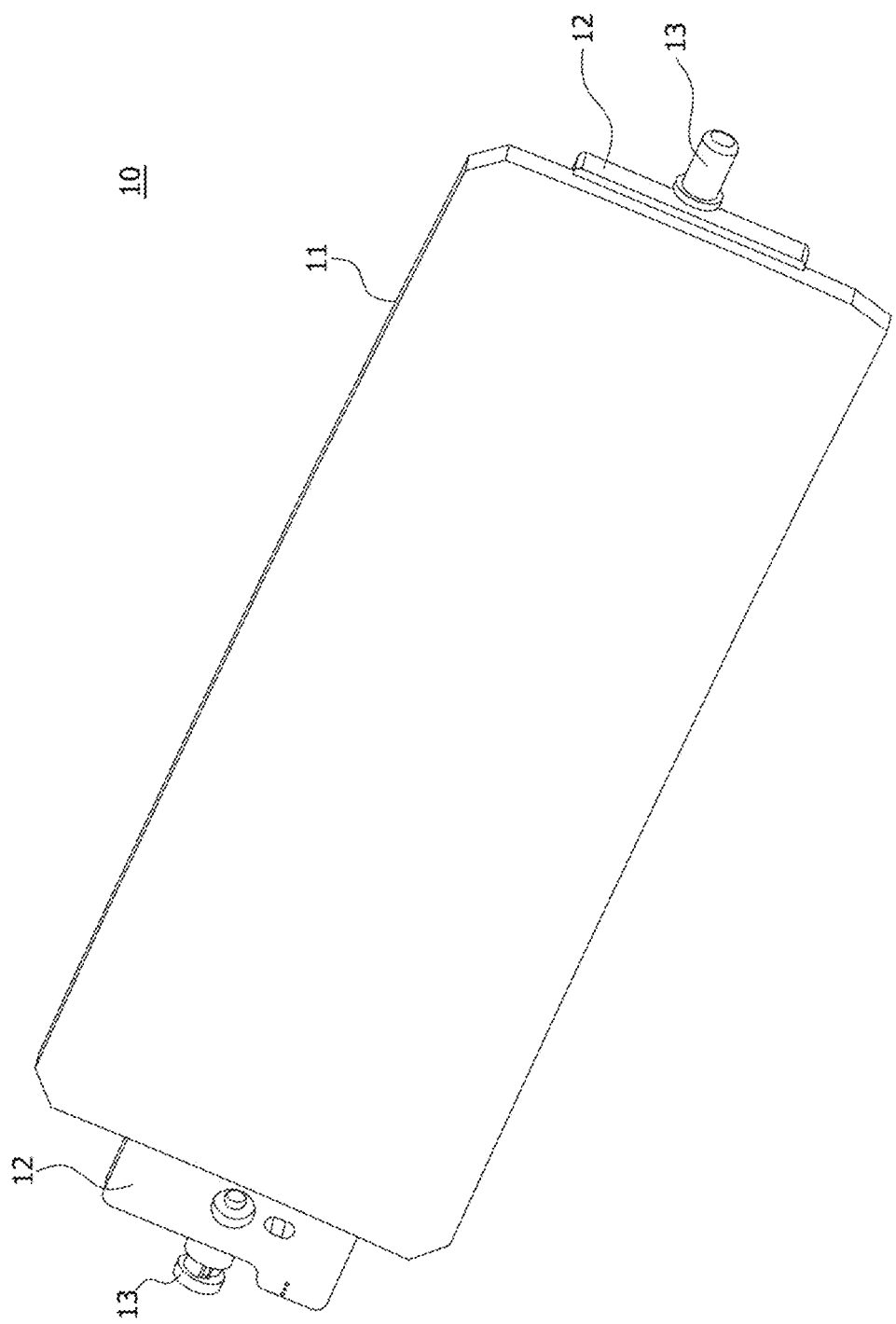
FIG. 3 is a view schematically illustrating a mirror part in accordance with the embodiment of the present disclosure.

FIG. 3 is a view schematically illustrating the mirror part in accordance with the embodiment of the present disclosure. Referring to FIG. 3, the mirror part 10 in accordance with the embodiment of the present disclosure includes a mirror reflector 11, a mirror extension 12 and a mirror shaft 13.

As the mirror reflector 11, an aspheric mirror may be used to reflect an image emitted from the display unit (not illustrated).

The mirror extension 12 is formed on either side of the mirror reflector 11, and the mirror shaft 13 is formed on the mirror extension 12 and rotatably mounted on the support part 90. For example, the mirror shaft 13 may serve as a rotating shaft of the mirror reflector 11.

Figure 4:
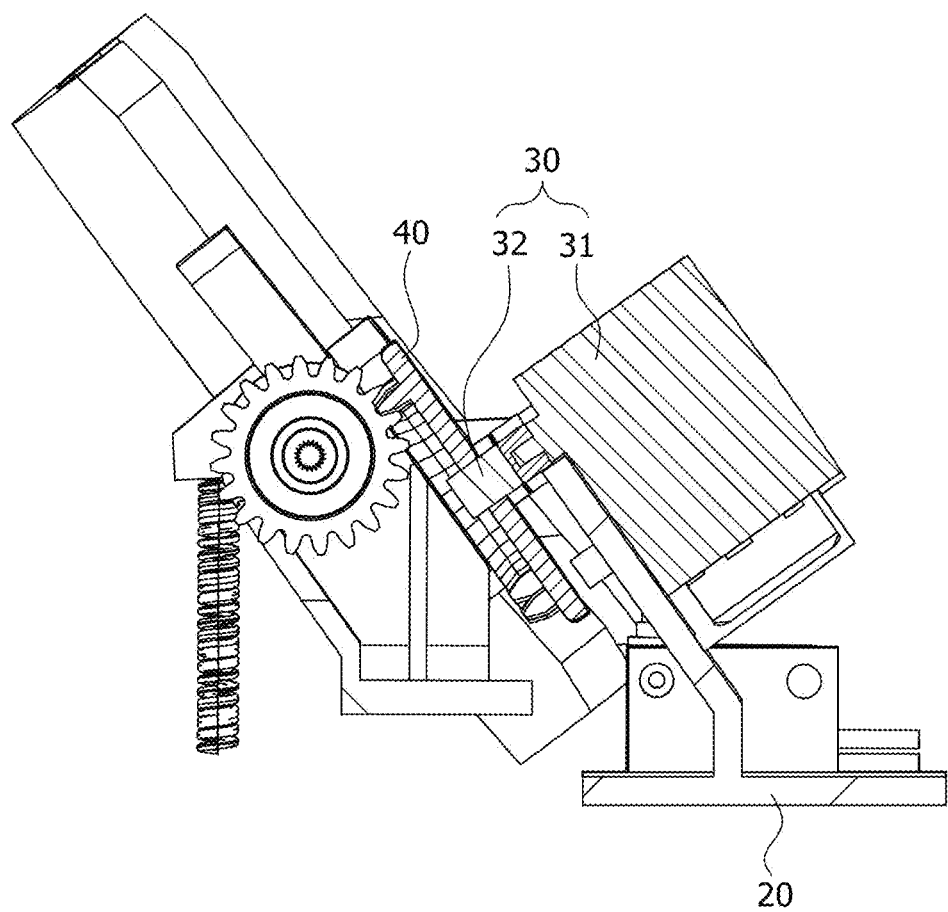
FIG. 4 is a view schematically illustrating a driving part in accordance with the embodiment of the present disclosure.

FIG. 4 is a view schematically illustrating the driving part in accordance with the embodiment of the present disclosure. Referring to FIG. 4, the driving part 30 in accordance with the embodiment of the present disclosure includes a driving motor 31 and a driving shaft 32.

The driving motor 31 is mounted in the housing part 20, and the driving shaft 32 is formed in the driving motor 31 through the housing part 20. The driving shaft 32 is connected to the spiral gear part 40, and rotated as power is applied to the driving motor 31.

For example, the driving shaft 32 may have an angled cross-section so as to be engaged with the spiral gear part 40, and transfer a rotation force to the spiral gear part 40. In addition, the driving shaft 32 may employ various coupling methods to transfer power to the spiral gear part 40.

Figure 5:
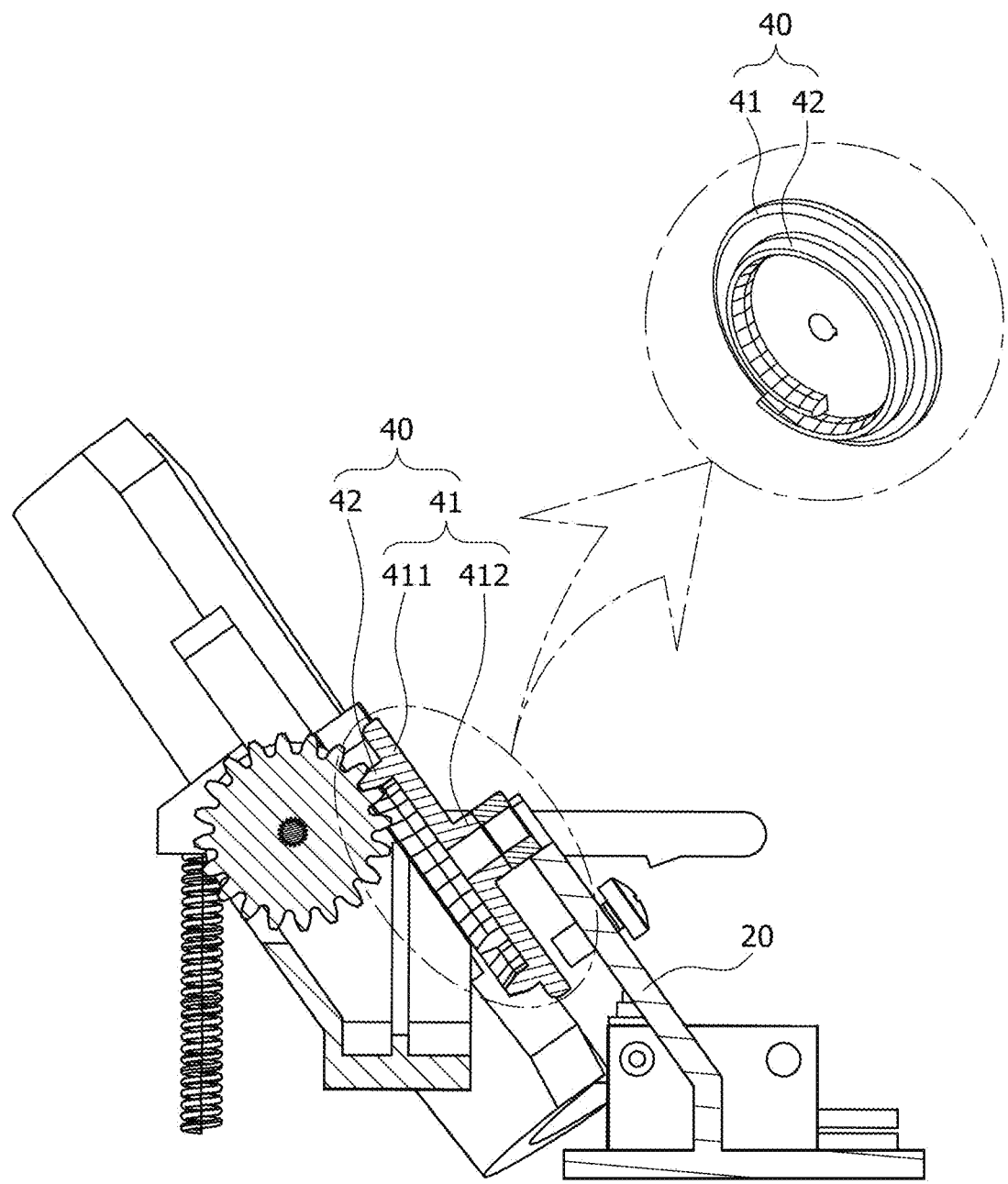
FIG. 5 is a view schematically illustrating a spiral gear part in accordance with the embodiment of the present disclosure.

FIG. 5 is a view schematically illustrating the spiral gear part in accordance with the embodiment of the present disclosure. Referring to FIG. 5, the spiral gear part 40 in accordance with the embodiment of the present disclosure includes a spiral plate 41 and a spiral protrusion 42.

The spiral plate 41 is connected to the driving part 30. For example, the spiral plate 41 may include a disk-shaped plate part 411 and a plate insertion part 412 which protrudes from one side of the plate part 411 such that the driving shaft 32 is inserted into the plate insertion part 412. The plate insertion part 412 may be rotatably supported by the housing part 20.

The spiral protrusion 42 is formed on the spiral plate 41, and protrudes in a spiral shape to rotate the mirror rotating part 50. For example, the plate insertion part 412 may be formed on one surface of the plate part 411, and the spiral protrusion 42 may be formed on the other surface of the plate part 411. The rotation speed of the mirror part 10 may be changed according to the rate of change in curve of the spiral protrusion 42. Therefore, as the rate of change in curve of the spiral protrusion 42 is decreased, fine rotation of the mirror part 10 may be induced, which makes it possible to perform precise control.

For example, when the radius of the spiral gear part 40 is increased, a guide line of the spiral protrusion 42 deployed in a spiral shape may also be increased. Thus, the tilting angle of the mirror part 10 can be finely adjusted.

Figure 6:
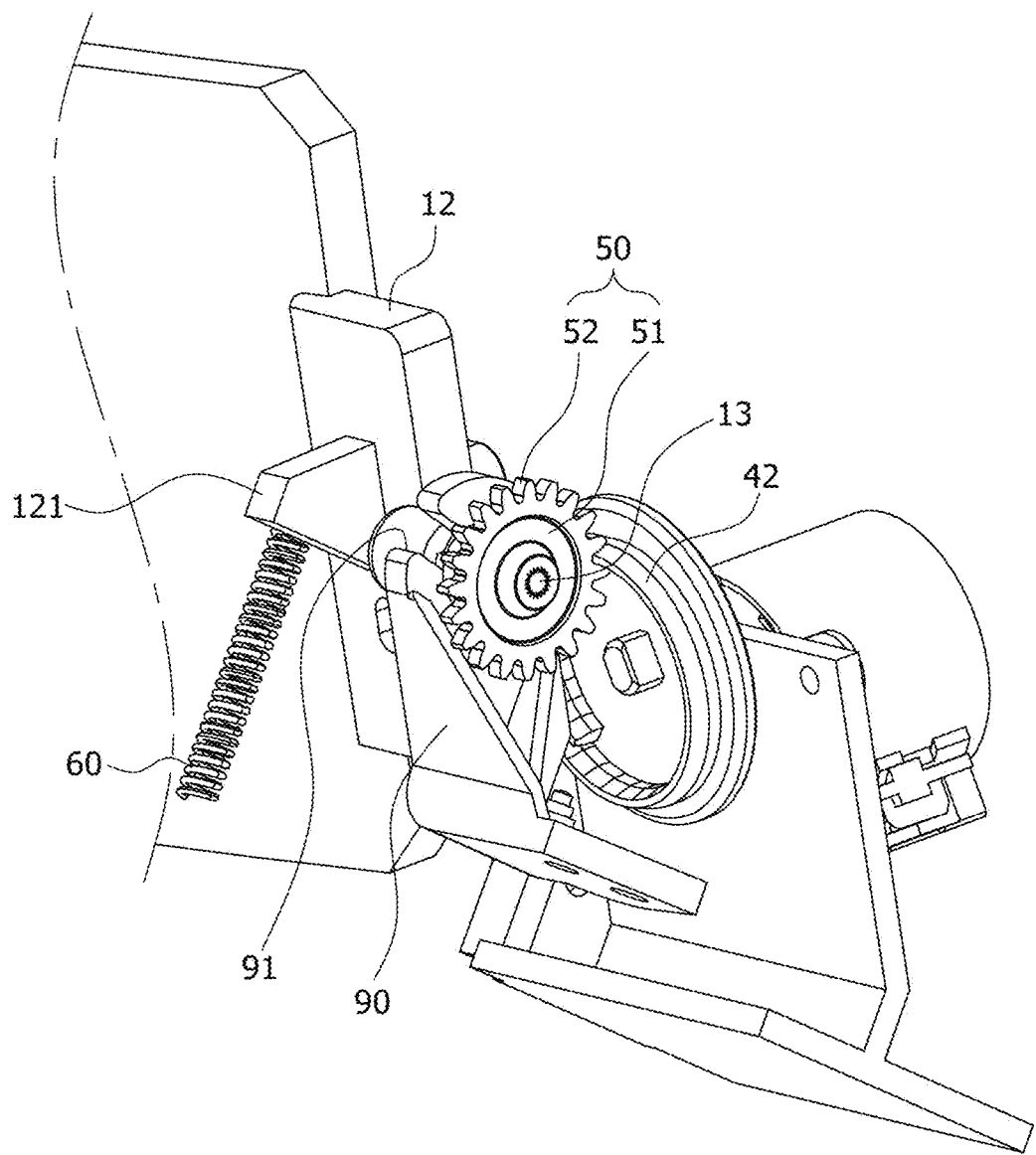
FIG. 6 is a view schematically illustrating a mirror rotating part in accordance with the embodiment of the present disclosure.

FIG. 6 is a view schematically illustrating the mirror rotating part in accordance with the embodiment of the present disclosure. Referring to FIG. 6, the mirror rotating part 50 in accordance with the embodiment of the present disclosure includes a rotation coupler 51 and a rotating gear 52.

The rotation coupler 51 is connected to the mirror part 10. For example, the rotation coupler 51 may be formed in a disk shape, and the mirror shaft 13 may be inserted into the rotation coupler 51 so as to transfer power.

The rotating gear 52 may be formed on the outer circumferential surface of the rotation coupler 51, and engaged with the spiral protrusion 42. For example, the spiral protrusion 42 may be inserted between the teeth of the rotating gear 52, and the rotating gear 52 may be rotated in connection with rotation of the spiral protrusion 42.

The mirror rotating part 50 may be formed in a spur gear shape engaged with the spiral protrusion 42, such that the central portion thereof is connected to the mirror shaft 13.

At this time, the rotation of the spiral gear part 40 by the rotation of the mirror rotating part 50 is restricted. That is, the mirror rotating part 50 is rotated when the spiral gear part 40 is driven, but the reverse drive of the spiral gear part 40 by the rotation of the mirror rotating part 50 is restricted. Thus, although holding torque of the driving part 30 is minimized or removed even when the vehicle vibrates, the mirror part 10 can maintain its own position. For example, as the rate of change in curve of the spiral protrusion 42 is decreased, the reverse drive can be prevented between the spiral protrusion 42 and the rotating gear 52.

An elastic part 60 in accordance with the embodiment of the present disclosure is connected to the mirror part 10, and applies an elastic force to the mirror part 10 such that the mirror rotating part 50 is pressed against the spiral gear part 40.

For example, the elastic part 60 may be formed in a coil spring shape, and have an upper end coupled to an extension protrusion 121 formed on the mirror extension 12. Furthermore, the elastic part 60 can prevent a backlash between the mirror rotating part 50 and the spiral protrusion 42 while the spiral protrusion 42 is rotated by a restoring force of the elastic part 60, thereby minimizing a position error of the mirror rotating part 50.

That is, the mirror shaft 13 may be movably inserted into a support groove 91 formed in the support part 90, and the state in which the rotating gear 52 is pressed against the spiral protrusion 42 can be maintained by the restoring force of the elastic part 60.

Figure 7:
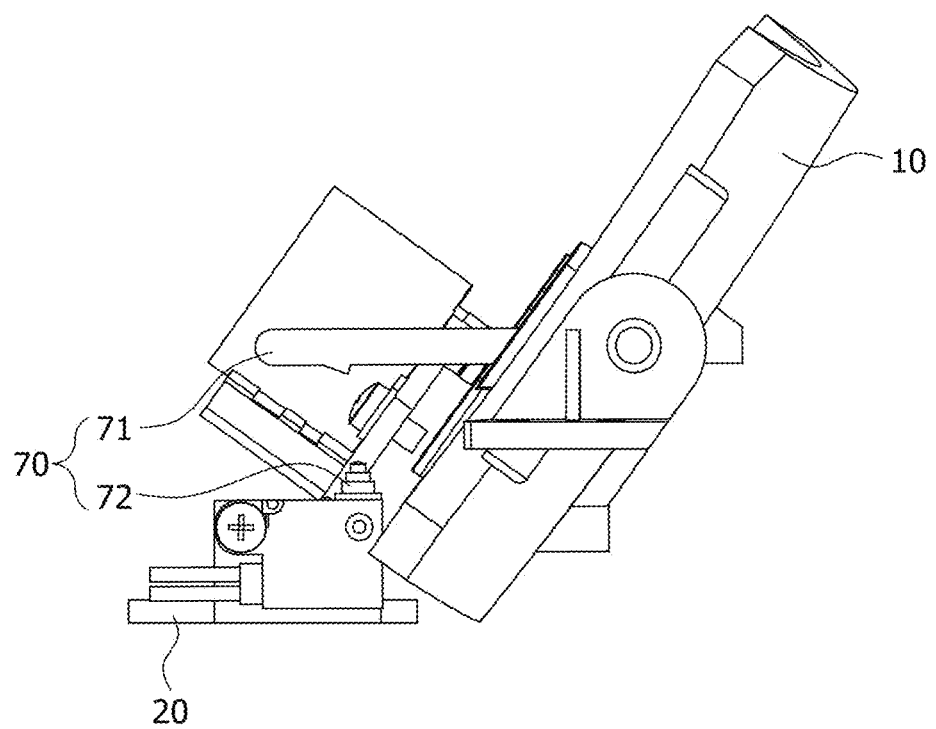
FIG. 7 is a view schematically illustrating a state before a sensing operation of a switch part in accordance with a first embodiment of the present disclosure.
Figure 8:
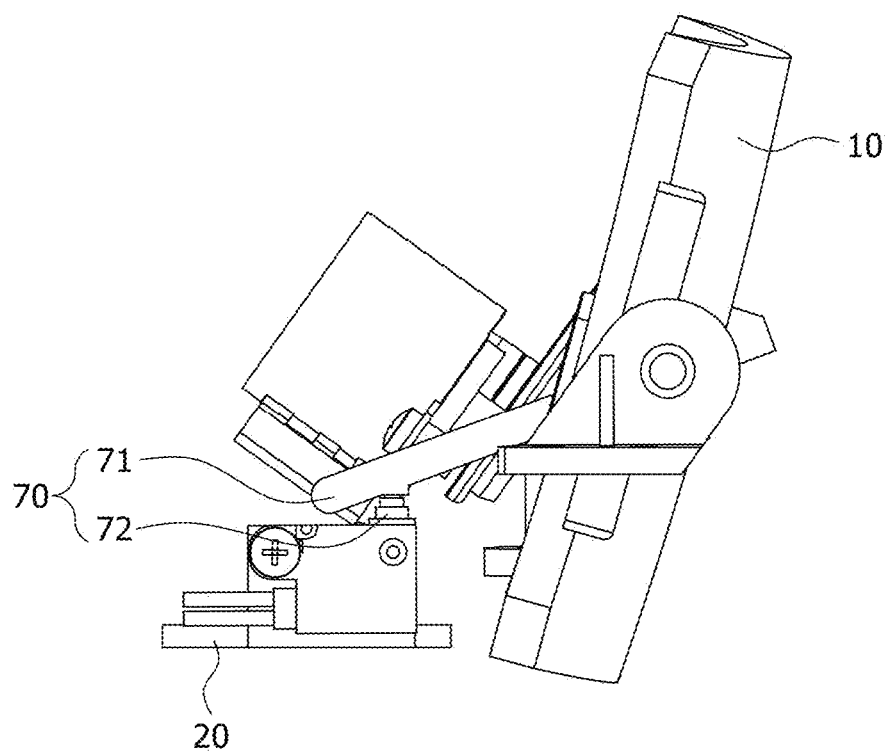
FIG. 8 is a view schematically illustrating a sensing state of the switch part in accordance with the first embodiment of the present disclosure.

FIG. 7 is a view schematically illustrating a state before a sensing operation of a switch part in accordance with a first embodiment of the present disclosure, and FIG. 8 is a view schematically illustrating a sensing state of the switch part in accordance with the first embodiment of the present disclosure. Referring to FIGS. 7 and 8, the switch part 70 in accordance with the first embodiment of the present disclosure includes a mirror switch 71 and a switch sensor 72, and senses an angular position of the mirror part 10.

The mirror switch 71 is mounted on the mirror part 10. For example, the mirror switch 71 may be coupled to the mirror extension 12, and protrude toward the housing part 20.

The switch sensor 72 is mounted on the housing part 20, and senses the mirror switch 71. The switch sensor 72 may sense the position of the mirror switch 71 in a contact or non-contact manner.

More specifically, when the mirror switch 71 is brought into contact with the switch sensor 72 by rotation of the mirror part 10, the switch sensor 72 may sense the mirror switch 71 and consider that the mirror part 10 has reached the home position. At this time, a push switch may be used as the switch sensor 72.

The home position of the mirror part 10 may correspond to a parking mode position to which the mirror part 10 is rotated in order to prevent solar light from being incident on the mirror part 10. The home position of the mirror switch 71 may be set to the same position as or different position from the parking mode position.

Figure 9:
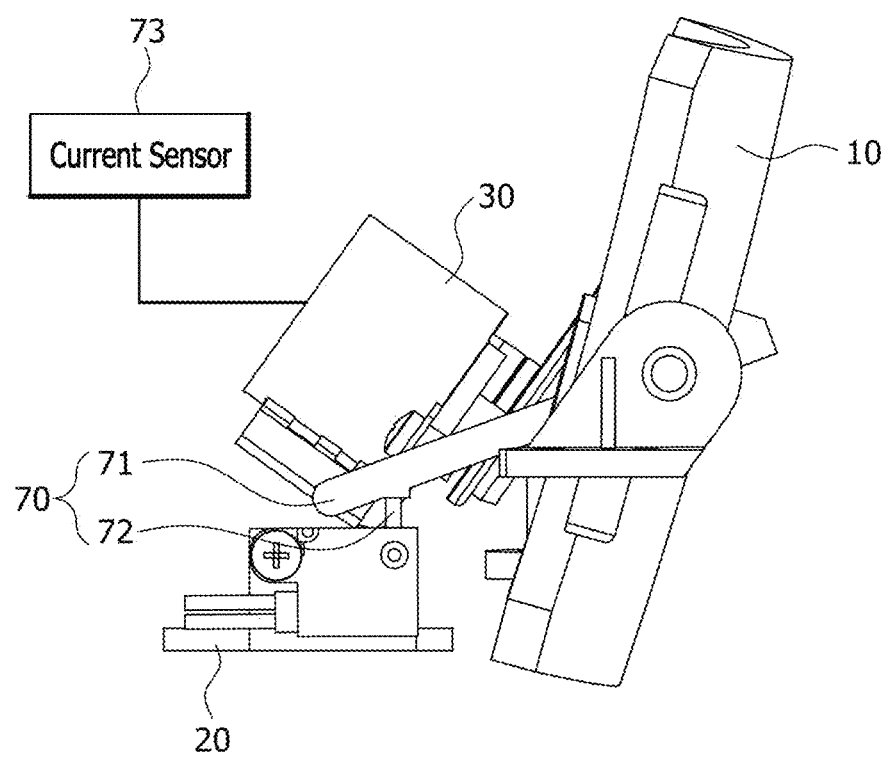
FIG. 9 is a view schematically illustrating a switch part in accordance with a second embodiment of the present disclosure.

FIG. 9 is a view schematically illustrating a switch part in accordance with a second embodiment of the present disclosure. Referring to FIG. 9, the switch part 70 in accordance with the second embodiment of the present disclosure includes a current sensor 73, and the current sensor 73 senses a stall electric current of the driving part 30.

That is, when the rotation of the mirror part 10 is restricted, the current sensor 73 may sense a stall electric current of the driving part 30. When the current sensor 73 senses the stall electric current of the driving part 30, the current sensor 73 may consider that the mirror part 10 has reached the home position.

For example, when the mirror switch 71 reaches the switch sensor 72 which is a rigid body, the driving shaft 32 mounted in the driving motor 31 is not rotated any more due to the resistance of the mirror switch 71. An electric current in such a state that the driving shaft 32 is not rotated any more due to a load applied to the driving motor 31 is referred to as the stall electrical current. Therefore, when the current sensor 73 senses the stall electric current, it may indicate that the mirror part 10 has reached the home position.

Figure 10:
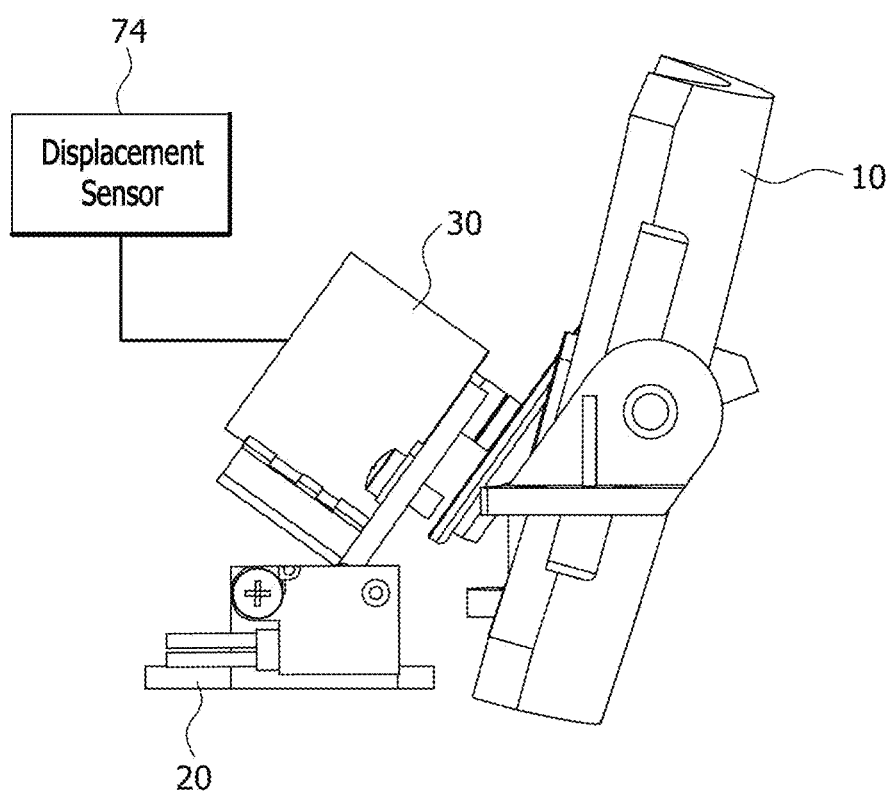
FIG. 10 is a view schematically illustrating a switch part in accordance with a third embodiment of the present disclosure.

FIG. 10 is a view schematically illustrating a switch part in accordance with a third embodiment of the present disclosure. Referring to FIG. 10, the switch part 70 in accordance with the third embodiment of the present disclosure includes a displacement sensor 74, and the displacement sensor 74 senses an angular displacement of the driving part 30.

That is, when the angular displacement of the driving part 30, measured by the displacement sensor 74, coincides with an angular displacement for making the mirror part 10 reach the home position, it may be considered that the mirror part 10 has reached the home position.

For example, the displacement sensor 74 may measure an angular displacement of the driving shaft 32 in real time. Furthermore, when the angular displacement of the driving shaft 32, measured in real time, coincides with a preset angular displacement for making the mirror part 10 reach the home position, it may indicate that the mirror part 10 has reached the home position.

The angular position of the mirror part 10 may be sensed through various methods and sensors.

The operation of the headup display device in accordance with the embodiment of the present disclosure, which has the above-described structure, will be described as follows.

When the driving shaft 32 is rotated in one direction according to a control signal of a controller in the case that the mirror part 10 needs to be tilted, the spiral gear part 40 connected to the driving shaft 32 is rotated in the one direction, and the mirror part 10 engaged with the spiral protrusion 42 is rotated in the one direction.

At this time, when the mirror switch 71 mounted on the mirror extension 12 is brought into contact with the switch sensor 72, the controller recognizes the home position, and rotates the driving shaft 32 in the other direction such that the mirror part 10 is rotated to a preset position. Thus, the spiral gear part 40 connected to the driving shaft 32 may be rotated in the other direction, and the mirror part 10 engaged with the spiral protrusion 42 may be rotated in the other direction and tilted to the preset position.

In addition, when an angular displacement of the driving part 30 or the mirror part 10 is sensed, the home position may be sensed according to the control signal of the controller. When the home position is sensed, the controller may drive the driving part 30 to rotate the mirror part 10 to the preset position.

Since the structure in which the spiral protrusion 42 and the mirror rotating part 50 are engaged with each other is applied, the resolving power when the mirror part 10 is tilted may be determined by a gear reduction ratio within the driving part 30 and the diameter of the spiral protrusion 42.

In the headup display device 1 in accordance with the embodiment of the present disclosure, the mirror rotating part 50 is engaged and rotated with the spiral protrusion 42 when the spiral gear part 40 is rotated. Thus, the rotation angle of the mirror rotating part 50 may be finely changed. Therefore, the tilting angle of the mirror part 10 interlocked with the mirror rotating part 50 can be precisely adjusted, and the resolving power of the mirror part 10 can be improved. Since the resolving power of the mirror part 10 is improved, the optical performance of the headup display device 1 can be improved.

In the headup display device 1 in accordance with the embodiment of the present disclosure, the elastic part 60 applies an elastic force to the mirror part 10 so as to press the mirror rotating part 50 against the spiral gear part 40. Thus, when the spiral gear part 40 is rotated, a backlash between the mirror rotating part 50 and the spiral gear part 40 may be prevented to minimize a position error of the mirror rotating part 50. Therefore, since the rotation angle of the spiral gear part 40 is accurately controlled, the tilting angle of the mirror part 10 can be accurately adjusted.

Figure 11:
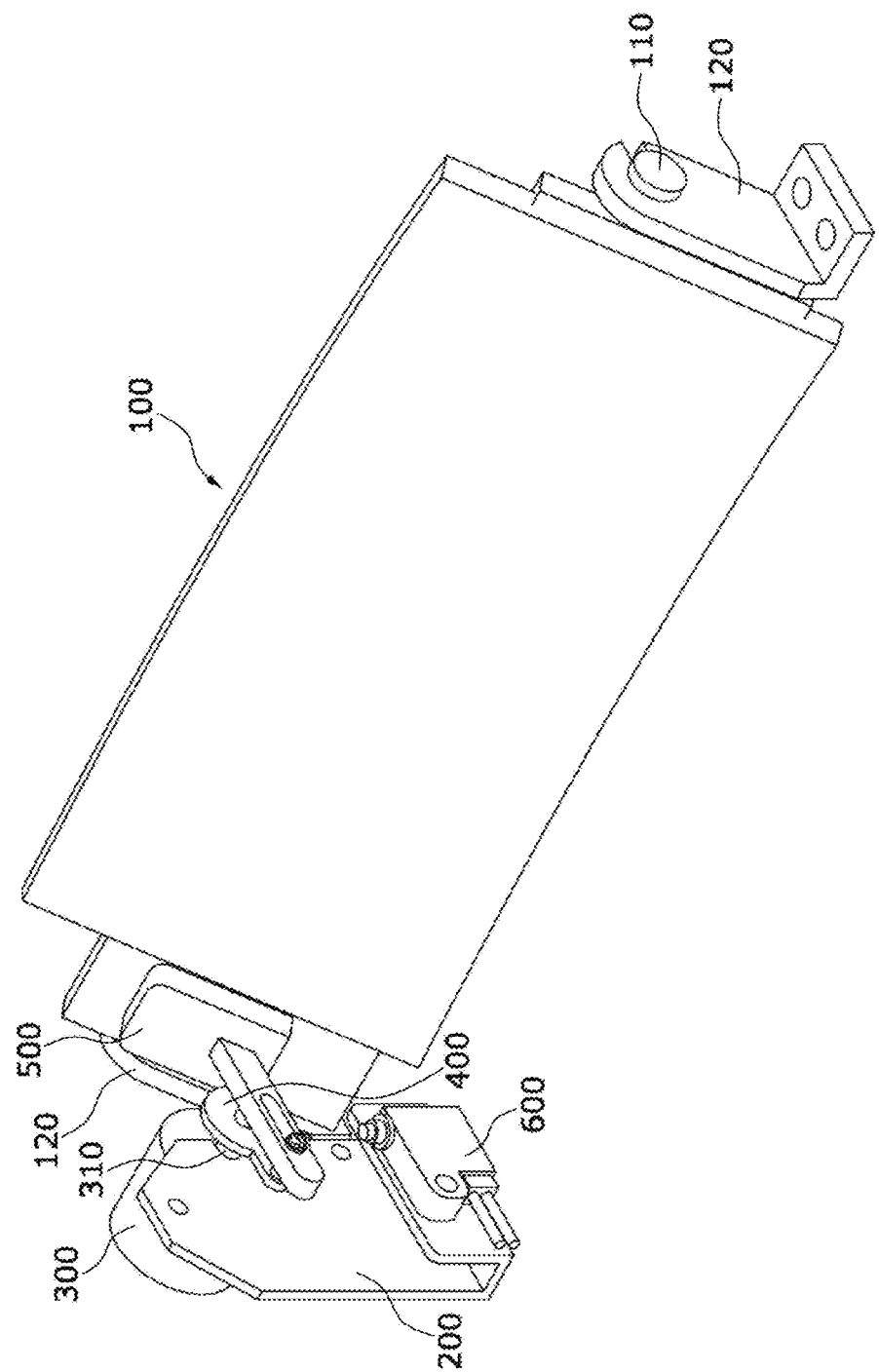
FIG. 11 is a perspective view illustrating a headup display device in accordance with another embodiment of the present disclosure.
Figure 12:
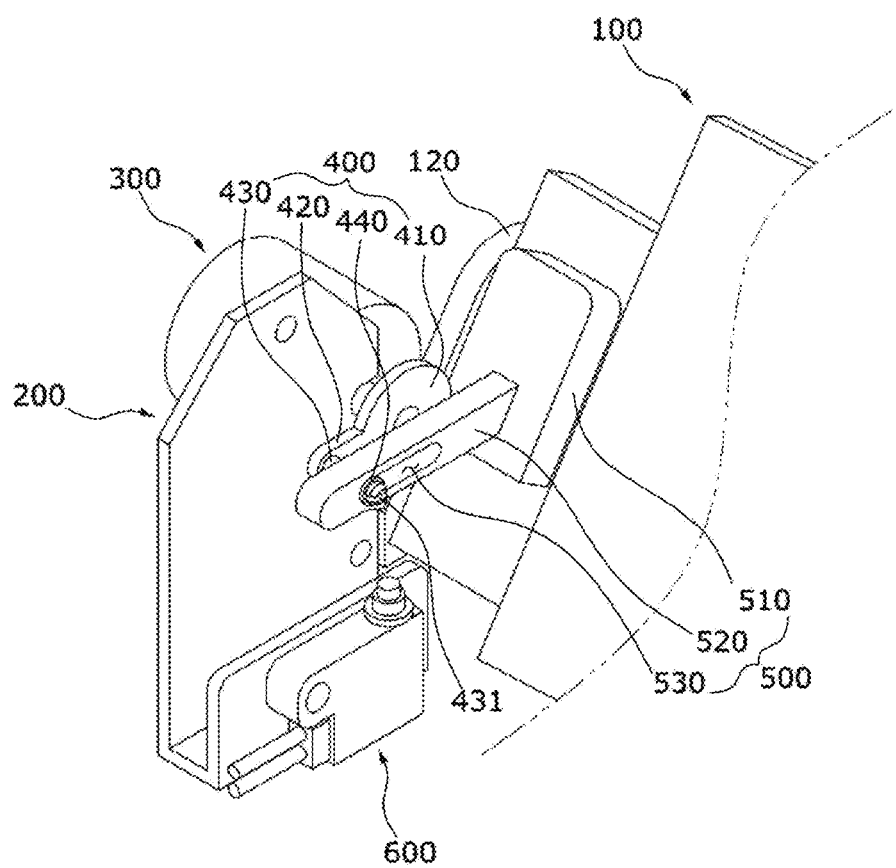
FIG. 12 is an expanded view illustrating a part of the headup display device in accordance with the embodiment of the present disclosure.
Figure 13:
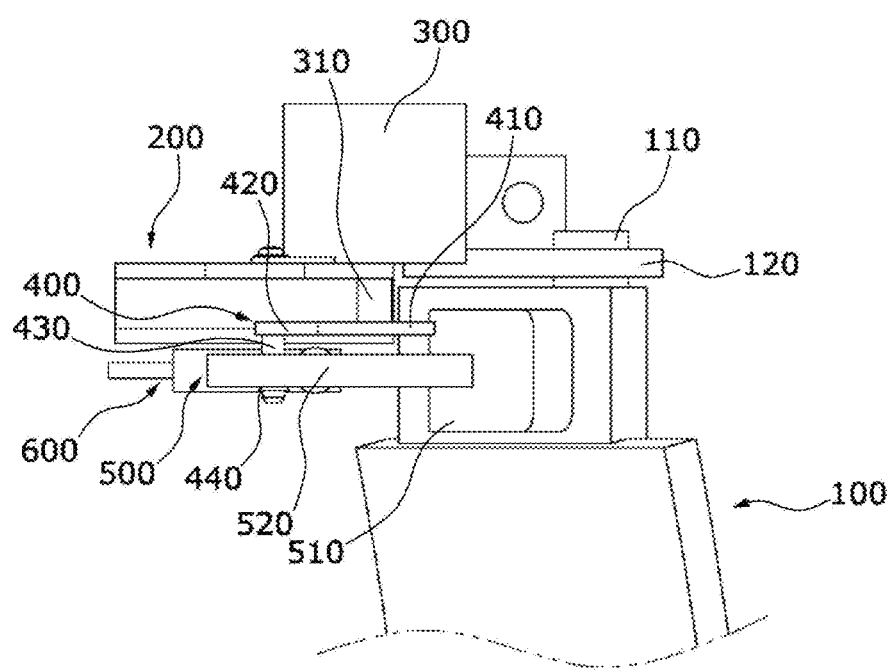
FIG. 13 is a plan view illustrating the headup display device in accordance with the embodiment of the present disclosure.
Figure 14:
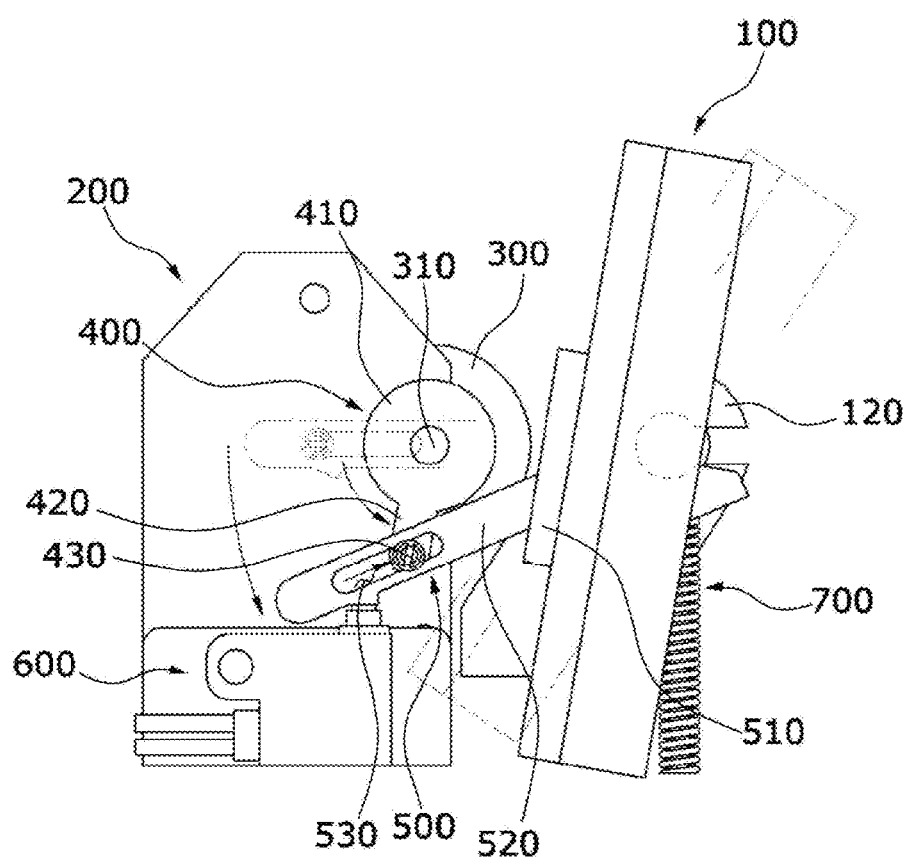
FIG. 14 is a view illustrating an operation state of the headup display device in accordance with the embodiment of the present disclosure.
Figure 15:
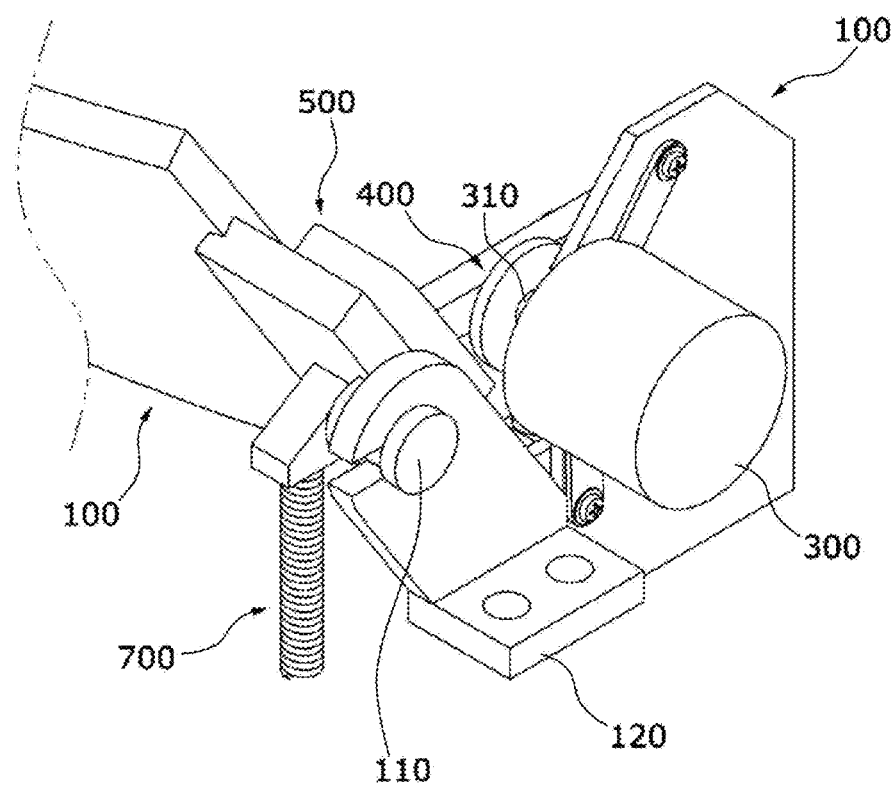
FIG. 15 is a rear perspective view illustrating the headup display device in accordance with the embodiment of the present disclosure.
Figure 16:
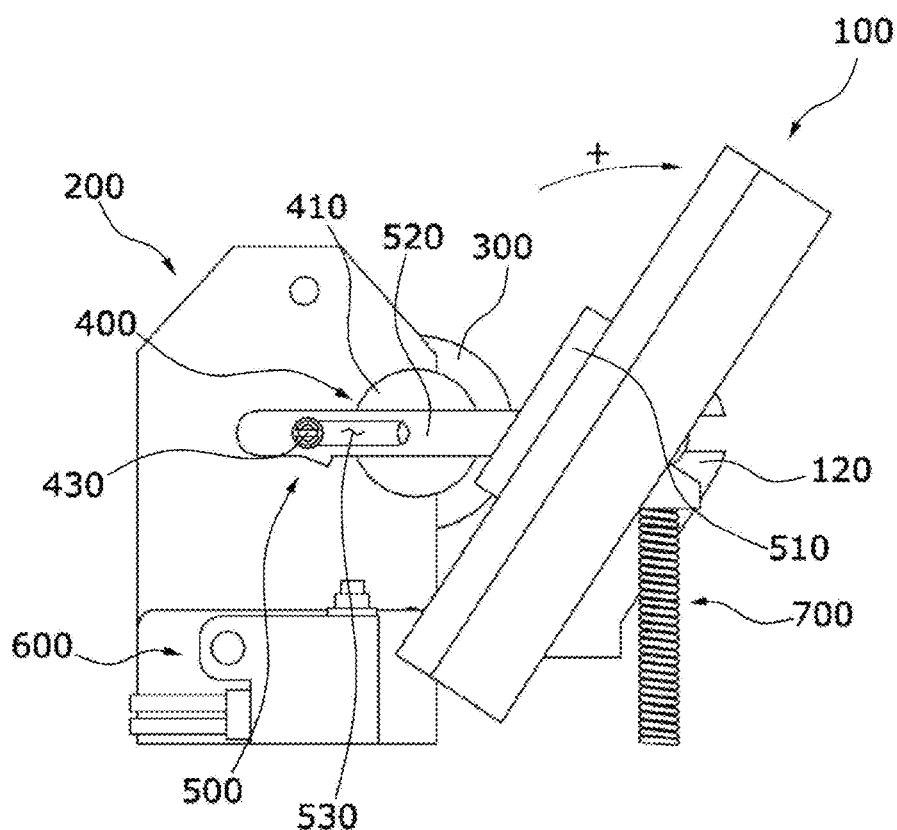
FIGS. 16 and 17 are views illustrating a rotation state of a mirror part in accordance with the embodiment of the present disclosure.
Figure 17:
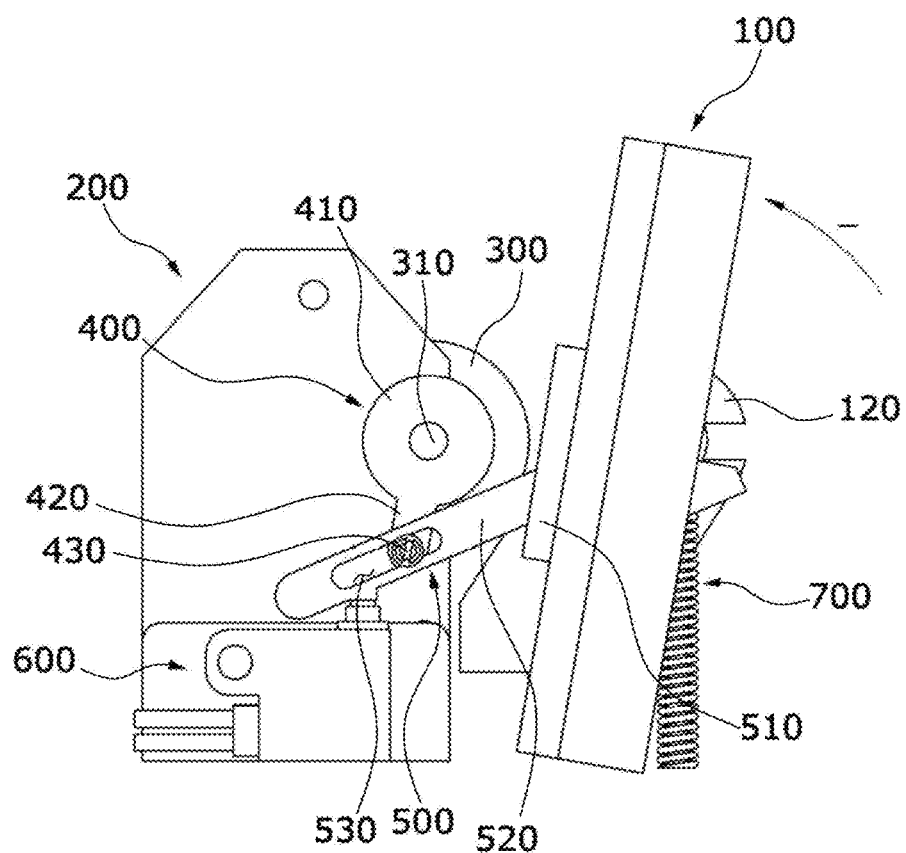

FIG. 11 is a perspective view illustrating a headup display device in accordance with another embodiment of the present disclosure, FIG. 12 is an expanded view illustrating a part of the headup display device in accordance with the embodiment of the present disclosure, and FIG. 13 is a plan view illustrating the headup display device in accordance with the embodiment of the present disclosure. FIG. 14 is a view illustrating an operation state of the headup display device in accordance with the embodiment of the present disclosure, FIG. 15 is a rear perspective view illustrating the headup display device in accordance with the embodiment of the present disclosure, and FIGS. 16 and 17 are views illustrating a rotation state of a mirror part in accordance with the embodiment of the present disclosure.

Referring to FIGS. 11 to 17, the headup display device in accordance with the embodiment of the present disclosure includes a mirror part 100, a support part 200, a driving motor 300, a driving wheel 400 and a mirror link part 500.

The mirror part 100 serves to reflect an image emitted from a display unit, and is an aspheric mirror.

The mirror part 100 includes a pair of mirror hinges 110 and a mirror support 120.

The pair of mirror hinges 110 protrude outward from both side surfaces of the mirror part 100 on a rotating shaft 310.

The mirror support 120 is rotatably coupled to each of the pair of mirror hinges 110, and rotatably supports the mirror part 100.

The mirror support 120 has a mirror hinge hole (not illustrated) into which the corresponding mirror hinge 110 is rotatably inserted.

The support part 200 is installed on one side of the mirror part 100 around the mirror hinge 110 protruding from one side of the mirror part 100.

The support part 200 supports the mirror part 100, the driving motor 300 and the like.

The driving motor 300 is installed on the support part 200. Desirably, a step motor may be applied as the driving motor 300.

That is, since the driving motor 300 is configured as a step motor, the resolving power of the mirror part 100 can be improved by a gear reduction ratio within the motor.

The improvement in resolving power of the mirror part 100 can enhance the optical performance of the headup display device, and make it possible to finely adjust the tilting angle of the mirror part 100 according to the height of a passenger.

The driving motor 300 installed on the support part 200 is coupled to the driving wheel 400 to rotate the driving wheel 400.

Thus, the driving motor 300 may rotate the driving wheel 400 while stably supported by the support part 200, which makes it possible to prevent the driving wheel 400 from swaying when the driving wheel 400 is rotated. As the vibration of the driving wheel 400 is prevented, the rotation angle of the mirror link part 500 can be accurately controlled.

The driving wheel 400, which is connected to the driving motor 300 so as to be rotated by the driving motor 300, is rotatably coupled to the support part 200 through the driving motor 300.

As illustrated in FIGS. 12 and 13, the driving motor 300 and the driving wheel 400 are disposed in one direction and the other direction, respectively, based on the support part 200.

More specifically, the driving wheel 400 is disposed on one side of the support part 200, where the mirror part 100 is disposed, and the driving motor 300 is disposed on the other side of the support part 200, i.e. the opposite side of the mirror part 100.

Such a driving wheel 400 includes a wheel body 410, a guide 420 and a sliding protrusion 430.

The wheel body 410 is formed in a disk shape, coupled to the rotating shaft 310 of the driving motor 300, and rotated by the rotation of the driving motor 300.

The wheel body 410 has a coupling hole formed in the center thereof, such that the rotating shaft 310 of the driving motor 300 can be coupled to the coupling hole.

The rotating shaft 310 and the coupling hole may be formed in a polygonal shape such that the wheel body 410 can be easily rotated.

The guide 420 is extended outward from the outer circumferential surface of the wheel body 410 by a predetermined distance, and formed in a straight bar shape.

As the guide 420 is extended from the outer circumferential surface of the wheel body 410, the guide 420 is rotated in the circumferential direction when the wheel body 410 is rotated.

The sliding protrusion 430 is extended from an end of the bar-shaped guide 420, corresponding to the opposite side of the side where the wheel body 410 is disposed, toward the mirror part 100, such that the mirror link part 500 is slidably coupled to the sliding protrusion 430.

The sliding protrusion 430 has a groove 431 formed at the end thereof and cut in the longitudinal direction.

Therefore, when the sliding protrusion 430 is inserted into the mirror link part 500 during a process of coupling the mirror link part 500 to the sliding protrusion 430, the sliding protrusion 430 may be retracted by the groove 431, such that the mirror link part 500 can be easily assembled to the driving wheel 400.

After the sliding protrusion 430 and the mirror link part 500 are assembled, the mirror link part 500 may be reliably fixed to the sliding protrusion 430 by an elastic force which is generated by the groove 431 while the end of the sliding protrusion 430 opens.

The mirror link part 500 has one end connected to the mirror part 100 and the other end connected to the driving wheel 400, and rotates the mirror part 100 according to the rotation of the driving wheel 400.

Specifically, the mirror link part 500 protrudes around the mirror hinge 110, connected to the one end thereof, toward the driving motor 300.

When the driving wheel 400 is rotated by the driving motor 300, the mirror link part 500 rotates the mirror part 100 through the sliding protrusion 430 of the guide 420.

The mirror link part 500 includes a link body 510, a link lever 520 and a link slot 530.

The link body 510 is coupled to the mirror part 100, and forms the body of the mirror link part 500.

The link lever 520 protrudes from one side of the link body 510, and is formed in a bar shape with a predetermined thickness.

The link lever 520 has a larger length than the guide 420 when disposed in parallel to the guide 420.

The link slot 530 is formed in the link lever 520 having a predetermined thickness, and the sliding protrusion 430 is disposed through the link slot 530.

The link slot 530 has a smaller inner diameter than the outer diameter of the sliding protrusion 430.

Thus, the sliding protrusion 430 of the driving wheel 400 may be reliably fixed to the link slot 530 by the elastic force which is generated while the groove 431 of the sliding protrusion 430 opens.

Since the sliding protrusion 430 and the link slot 530 are brought into line contact with each other, a load may be distributed to the line contact portion by vibration, acceleration and friction of the vehicle.

Thus, the line contact portion of the mirror link part 500 can be suppressed from being abraded and deformed, which makes it possible to prevent degradation in driving precision or optical performance.

When the driving wheel 400 is rotated in the CCW (Counter Clock Wise) direction as illustrated in FIG. 14, the sliding protrusion 430 is moved in one direction in the link slot 530. Simultaneously, the sliding protrusion 430 pressurizes the link slot 530 upward, such that the mirror part 100 connected to the mirror link part 500 is rotated in the CCW direction around the rotating shaft 310 of the mirror hinge 110.

On the other hand, when the driving wheel 400 is rotated in the CW (Clock Wise) direction, the sliding protrusion 430 is moved in the other direction from the link slot 530. Simultaneously, the sliding protrusion 430 pressurizes the link slot 530 downward, such that the mirror part 100 connected to the mirror link part 500 is rotated in the CW direction around the rotating shaft 310 of the mirror hinge 110.

Furthermore, a fixing ring 440 may be coupled to the end of the sliding protrusion 430 disposed through the link slot 530.

The fixing ring 440 is formed in a donut shape, and mounted on the end of the sliding protrusion 430 when the sliding protrusion 430 is disposed through the link slot 530 so as to protrude from the link lever 520.

Therefore, the fixing ring 440 may effectively suppress the sliding protrusion 430 from separating from the link slot 530, and remove a gap between the sliding protrusion 430 and the link slot 530, thereby reducing a mechanical error.

The headup display device further includes an elastic member 700 connected to the mirror part 100 and configured to apply an elastic force which pulls the mirror part 100 downward such that the sliding protrusion 430 is pressed against the link slot 530.

The elastic member 700 may be installed under the mirror part 100 so as to be erected in the top-to-bottom direction as illustrated in FIG. 15. Desirably, a tensile spring may be applied as the elastic member 700.

The elastic member 700 applies an elastic force to pressurize the mirror part 100 downward such that the sliding protrusion 430 is pressed against the link slot 530.

Thus, when the driving wheel 400 is rotated, the elastic member 700 can suppress a gap from being formed between the sliding protrusion 430 and the link slot 530, thereby preventing an error in rotation angle of the mirror part 100.

That is, since the rotation angle of the driving wheel 400 is accurately controlled, the rotation angle of the mirror part 100 can be accurately adjusted.

The headup display device further includes a switch part 600 installed on the support part 200 so as to sense an angular position of the mirror link part 500.

The switch part 600 is installed in such a manner that the link lever 520 of the mirror link part 500 is brought into contact with the switch part 600, when the driving wheel 400 is rotated to make the mirror link part 500 reach the home position (parking mode position) which is set according to the use environment.

The switch part 600 may be brought into contact with the link lever 520 by the rotation of the driving wheel 400, and thus accurately control the rotation angle of the mirror link part 500, i.e. the rotation angle of the mirror part 100.

Specifically, the switch part 600 may be brought into contact with the link lever 520 so as to sense the home position of the mirror link part 500 using a stall electric current.

The stall electric current refers to an electric current in such a state that the motor is not rotated any more due to a load applied to the motor, and is a characteristic value of the motor.

Therefore, when the characteristic electric current is sensed by the switch part 600, the switch part 600 may sense that the mirror link part 500 is at a stationary position. Thus, the switch part 600 may sense the home position of the mirror link part 500.

At this time, the link lever 520 may be brought into contact with the switch part 600 with a push part pushed by the link lever 520, such that the switch part 600 senses the stall electric current. The switch part 600 in accordance with the embodiment of the present disclosure may be configured as a stationary component such as a stopper. That is, when the link lever 520 is brought into contact with the switch part 600, the rotation of the link lever 520 may be suppressed to generate the stall electric current. Then, the switch part 600 can sense the home position of the mirror link part 500.

The home position of the mirror link part 500 corresponds to a position where external light such as solar light is concentrated on the mirror part 100 such that the display unit located in the headup display device can be prevented from being damaged. The home position of the mirror link part 500 may be set to the same position as or a different position from the parking mode position.

For example, the home position of the mirror link part 500 may be set so that the titling angle of the mirror part 100 become such an angle that dose not damage the display unit, in order to prevent sunburn of the display unit, caused by external light such as solar light.

In the present embodiment, it has been described that the home position of the mirror link part 500 is sensed through the switch part 600. However, the home position of the mirror link part 500 may be sensed through a rotation sensor or encoder (not illustrated) as long as the rotation sensor or encoder can sense the position of the mirror link part 500. The rotation sensor and the encoder can sense an angular displacement of the mirror link part 500 as well as the home position of the mirror link part 500.

In addition, the position of the mirror link part 500 may be sensed through various methods and sensors.

Furthermore, a height difference between drivers may cause an eye-level difference. Thus, the sliding protrusion 430 may be slid in the link slot 530 according to the rotation angle of the driving motor 300, and thus finely adjust the tilting angle of the mirror part 100 to an angle suitable for a driver.

For example, when the driver's height is larger than the average height, the tilting angle of the mirror part 100 may be adjusted in the positive (+) direction as illustrated in FIG. 16. On the other hand, when the driver's height is smaller than the average height, the tilting angle of the mirror part 100 may be adjusted in the negative (−) direction as illustrated in FIG. 17.

In the above-described headup display device in accordance with the embodiment of the present disclosure, the driving motor 300 may be configured as a step motor. Thus, the resolving power of the mirror part 100 can be improved by the gear reduction ratio within the motor, and the optical performance of the headup display device can be improved. Furthermore, the headup display device can finely adjust the tilting angle of the mirror part 100 according to a passenger's height.

Thus, the driving motor 300 installed on the support part 200 may be coupled to the driving wheel 400 and rotate the driving wheel 400, which makes it possible to prevent the driving wheel 400 from vibrating when the driving wheel 400 is rotated. As the driving wheel 400 is prevented from vibrating, the rotation angle of the mirror link part 500 can be accurately controlled.

Furthermore, the sliding protrusion 430 has the groove 431 formed at the end thereof and cut in the longitudinal direction thereof. Thus, when the sliding protrusion 430 is inserted into the mirror link part 500 during the process of coupling the mirror link part 500 to the sliding protrusion 430, the sliding protrusion 430 may be retracted by the groove 431 such that the mirror link part 500 can be easily assembled to the driving wheel 400. After the sliding protrusion 430 and the mirror link part 500 are assembled, the mirror link part 500 may be reliably fixed to the sliding protrusion 430 by an elastic force which is generated while the end of the sliding protrusion 430 is opened by the groove 431.

Furthermore, the elastic member 700 may apply an elastic force to pressurize the mirror part 100 downward such that the sliding protrusion 430 is pressed against the link slot 530. Thus, when the driving wheel 400 is rotated, it is possible to suppress a gap from being formed between the sliding protrusion 430 and the link slot 530, thereby preventing an error in rotation angle of the mirror part 100. Furthermore, since the rotation angle of the driving wheel 400 is accurately controlled, the rotation angle of the mirror part 100 can be accurately adjusted.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A headup display device comprising:
    a support part;
    a mirror part rotatably supported by the support part;
    a housing part disposed on one side of the mirror part;
    a driving part disposed in the housing part;
    a spiral gear part rotatably connected to the driving part; and
    a mirror rotating part connected to the mirror part, and configured to rotate the mirror part as the spiral gear part is rotated,
    wherein the spiral gear part comprises:
        a disk-shaped plate having an insertion part connected to the driving part; and
        a spiral protrusion formed on the disk-shaped plate, and protruding in a spiral shape having a varying radius configured to rotate the mirror rotating part.

2. The headup display device of claim 1, wherein the driving part comprises:
    a driving motor disposed in the housing part; and
    a driving shaft disposed in the driving motor and extending through the housing part, connected to the insertion part of the spiral gear part, and configured to rotate when power is applied to the driving motor.

3. The headup display device of claim 1, wherein the mirror rotating part comprises:
    a rotation coupler connected to the mirror part; and
    a rotation gear formed on an outer circumferential surface of the rotation coupler, and engaged with the spiral protrusion.

4. The headup display device of claim 3, wherein a rotation of the spiral gear part is restricted by a rotation of the mirror rotating part.

5. The headup display device of claim 1, further comprising an elastic part connected to the mirror part, and configured to apply an elastic force to the mirror part such that the mirror rotating part is pressed against the spiral gear part.

6. The headup display device of claim 1, further comprising a switch part configured to sense an angular position of the mirror part.

7. The headup display device of claim 6, wherein the switch part comprises:
    a mirror switch mounted on the mirror part; and
    a switch sensor mounted on the housing part and configured to sense the mirror switch.

8. The headup display device of claim 6, wherein the switch part comprises a current sensor configured to sense a stall electric current of the driving part, wherein when a rotation of the mirror part is restricted, the current sensor senses the stall electric current of the driving part, and determines that the mirror part has reached a home position.

9. The headup display device of claim 6, wherein the switch part comprises a displacement sensor configured to sense an angular displacement of the driving part,
wherein when an angular displacement of the driving part is equal to an angular displacement for making the mirror part reach the home position, the switch part is configured to determine that the mirror part has reached a home position.

10. A headup display device comprising:
a mirror part configured to reflect an image emitted from a display unit;
a support part installed on one side of the mirror part;
a driving motor disposed on the support part;
a driving wheel connected to the driving motor and configured to be rotated by the driving motor; and
a mirror link part having one end connected to the mirror part and the other end connected to the driving wheel, and configured to rotate the mirror part in response to the rotation of the driving wheel,
wherein the mirror part comprises:
a pair of hinges protruding outward from both side surfaces of the mirror part on a rotating shaft; and
a mirror support rotatably coupled to each of the hinges, and configured to rotatably support the mirror part.

11. A headup display device comprising:
a mirror part configured to reflect an image emitted from a display unit;
a support part installed on one side of the mirror part;
a driving motor disposed on the support part;
a driving wheel connected to the driving motor and configured to be rotated by the driving motor; and
a mirror link part having one end connected to the mirror part and the other end connected to the driving wheel, and configured to rotate the mirror part in response to the rotation of the driving wheel,
wherein the driving wheel comprises:
a wheel body formed in a disk shape, and coupled to the driving motor so as to be rotated by rotation of the driving motor;
a guide extending outward from an outer circumferential surface of the wheel body; and
a sliding protrusion extending from an end of the guide toward the mirror part, and slidably coupled to the mirror link part.

12. The headup display device of claim 11, wherein the sliding protrusion has a groove cut in a longitudinal direction.

13. The headup display device of claim 11, wherein the mirror link part comprises:
a link body coupled to the mirror part;
a link lever protruding from one side of the mirror part; and
a link slot formed in the link lever such that the sliding protrusion is disposed through the link slot.

14. The headup display device of claim 13, wherein the link slot has an inner diameter smaller than an outer diameter of the sliding protrusion.

15. The headup display device of claim 13, wherein the driving wheel further comprises a fixing ring coupled to an end of the sliding protrusion disposed through the link slot.

16. The headup display device of claim 13, further comprising an elastic member connected to the mirror part, and configured to apply an elastic force to press the link lever against the link slot.

17. The headup display device of claim 13, further comprising a switch part disposed on the support part and configured to sense an angular position of the mirror link part.

18. The headup display device of claim 17, wherein the switch part is configured to be brought into contact with the link lever when the mirror link part reaches a home position.

* * * * *